United States Patent Office 3,313,767
Patented Apr. 11, 1967

3,313,767
AMIDINE COMPOUNDS AS THERMAL STABILIZERS FOR OXYMETHYLENE POLYMERS
Frank M. Berardinelli, South Orange, Raymond J. Kray, Berkeley Heights, and Thomas J. Dolce, Springfield, N.J., assignors to Celanese Corporation of America, New York, N.Y., a corporation of Delaware
No Drawing. Filed Feb. 24, 1964, Ser. No. 347,028
17 Claims. (Cl. 260—45.8)

This invention relates to polymers which are structurally related to polyoxymethylene and particularly to polymers of high thermal stability. This invention also relates to a method for improving the thermal stability of polymers. This application is a continuation-in-part of our application Ser. No. 256,146, filed Feb. 4, 1963, now abandoned, which is a continuation-in-part of our application Ser. No. 851,560, filed Nov. 9, 1959, now abandoned.

Polyoxmethylene polymers, having recurring

—CH$_2$O— units have been known for many years. They may be prepared by the polymerization of anhydrous formaldehyde or by the polymerization of trioxane which is a cyclic trimer of formaldehyde. Polyoxymethylene varies in thermal stability and in molecular weight, depending on its method of preparation.

High molecular weight polyoxymethylenes have been prepared by polymerizing trioxane in the presence of certain fluoride catalysts such as antimony fluoride and may also be prepared in high yields and at rapid reaction rates by the use of catalysts comprising boron fluoride coordination complexes with organic compounds, as described in U.S. Patent No. 2,989,506 of Donald E. Hudgin and Frank M. Berardinelli.

Although polyoxymethylenes prepared by some methods are much more stable against thermal degradation than those prepared by other methods, it is nevertheless desirable for many uses that the thermal stability be increased.

In accordance with the present invention the thermal stability of oxymethylene polymers is enhanced by the incorporation therein of at least one amidine compound, i.e. a compound having a carbon atom doubly bonded to one nitrogen atom and singly bonded to another. A preferred class of amidine compounds are the N-substituted amidine compounds wherein another nitrogen atom is singly bonded to the amidino group, most preferably at the carbon atom. Another preferred class of amidine compounds are those in which the carbon atom of the amidino group is bonded to another carbon atom, an oxygen atom or an hydrogen atom.

Suitable amidine compounds include the cyano-guanidine compounds including cyanoguanidine, itself, and other compounds including those containing the divalent 1-cyano-3,3 guanidino radical:

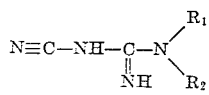

Among the suitable substituted cyanoguanidines which may be used are those having one or two suitable inert substituents at the 3-nitrogen position of the guanidine nucleus. For example, in the above formula, R$_1$ and R$_2$ may be the same or different inert substituents including hydrogen, alkyl, aryl cycloalkyl, hydroxyalkyl, haloalkyl, haloaryl and other substituents. Suitable inert substituents are defined, in the subject application, as those which will not induce undesirable reactions. Specific compounds which are suitable include 1-cyano-3 methyl guanidine, 1-cyano-3 ethyl guanidine, 1-cyano-3 isopropyl guanidine, 1-cyano-3,3-diphenyl guanidine, 1-cyano-3-hydroxymethyl guanidine, 1-cyano - 3 - dodecyl guanidine, 1-cyano-3-(2-hydroxyethyl) guanidine, 1-cyano-3-(2-bromoethyl) guanidine, 1-cyano-3-(m-chlorophenyl) guanidine and 1,3-dicyanoguanidine.

Polyaminotriazoles comprise another suitable class of amidine compounds.

Polyaminotriazoles are suitably prepared by heating a mixture of a dihydrazide of a dicarboxylic acid with aqueous hydrazine hydrate. For a particular dihydrazide, the molecular weight of the product will depend upon the temperature of the reaction, the proportion of water and the duration of the reaction. Higher temperatures, lower proportions of water and longer reaction periods are conducive to higher molecular weights.

Suitable polyaminotriazoles are those having structural units of the formula

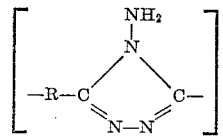

wherein R is an inert divalent organic radical free from groups which will induce undesirable reaction (thereby including only inert groups therein) and having two terminal carbon atoms through which it is joined to the triazole rings. Suitable polyaminotriazoles may be prepared from the dihydrazides of acids such as the following:

Isophthalic acid
Terephthalic acid
Phenylene diacetic acid
Phenylene dipropionic acids
Phenylene dibutyric acids
p,p'-Dicarboxy-1,5-diphenoxypentane
p,p'-Dicarboxy-1,4-diphenoxybutane
p,p'-Dicarboxy-diphenoxymethane
p-Carboxy-5-phenoxymethyl pyromucic acid
Thio bis cenanthic acid
Thio bis caproic acid
Sulfone bis caproic acid
Thio bis valeric acid
Sulfone bis propionic acid
Thio bis butyric acid
Sulfone bis butyric acid
Thio bis acetic acid
Sulfone bis acetic acid
p,p'-Dicarboxy diphenyl-1,4-dicarboxynaphthalene
Pinic acid
Norpinin acid
Homopinic acid Preferably R is an inert alkylene group of 6 to 12 carbon atoms. Such polyaminotriazoles are prepared as described above, utilizing as reactants the dihydrazides of dialkanoic acids having from 8 to 14 carbon atoms. Among the preferred dihydrazides are isosebacic dihydrazide, sebacic dihydrazide, azelaic dihydrazide, suberic dihydrazide, adipic dihydrazide, methyl adipic dihydrazide, decanedioic and undecanedioic dihydrazide.

Polyaminotriazoles suitable for use in accordance with this invention include polymers having an inherent viscosity of at least 0.3 and preferably from 0.3 to 0.7 in 0.1 wt. percent solution in m-cresol at 25° C.

When the polyaminotriazoles are prepared by the reaction of the dihydrazide and aqueous hydrazine, the preferred conditions for obtaining a product of the molecular weight specified above include a temperature between about 140° and 260° C., an amount of hydrazine between about 30 and 33 percent by weight, based on the weight of the dihydrazide, an amount of water between about 6 and 7 percent, based on the weight of the dihydrazide and a reaction period between about 18 and 24 hours.

Polyaminotriazoles, suitable for use in accordance with this invention may be prepared in other ways, as for example by the reaction of one mole of a dicarboxylic acid with more than two moles of aqueous hydrazine.

A complete description of the polyaminotriazoles suitable for use in accordance with this invention and of the methods for making such polyaminotriazoles may be found in U.S. Patent 2,512,601 of Bates et al. and U.S. Patent 2,512,667 of Moncrieff et al.

Amine-substituted triazines constitute another suitable class of amidine compounds.

The preferred compounds of this class are amine-substituted derivatives of symmetrical triazines, including guanamines (2,4-diamino sym. triazines), melamine (2,4,6-triamino sym. triazine) and substituted melamines. The amino groups may be primary, secondary or tertiary and other substituents such as hydroxyl substituents may be present. Of course, the amino groups and other substituents must be those which are inert, i.e., will not induce undesirable reactions. Among the specific compounds which are suitable are 2,4-diamino-6-phenyl sym. triazine (benzoguanamine); 2,4-diamino-6-methyl sym. triazine; 2,4-diamino-6-butyl sym. triazine; 2,4-diamino-6-benzyloxy sym. triazine; 2,4-diamino-6-butoxy sym. triazine; 2,4-diamino-6-cyclohexyloxy sym. triazine; 2,4-diamino-6-chloro sym. triazine; 2,4-diamino-6-mercapto sym. triazine; 2,4-dihydroxy-6-amino sym. triazine (ammelide); 2-hydroxy 4,6-diamino sym. triazine (ammeline); N,N,N',N'-tetracyanoethyl benzoguanamine; 2,4,6-triamino sym. triazine (melamine); phenyl melamine; butyl melamine; N,N-diethyl melamine; N,N-di-(2-hydroxyethyl) melamine; N,N-diphenyl melamine; N,N-diallyl melamine; N,N',N''-trimethyl melamine; N,N',N''-triethyl melamine; N,N',N''-tri(n-propyl) melamine; N,N',N''-tri-(n-butyl) melamine; N,N,N',N''-tetramethyl melamine; trimethylol melamine; trimethoxymethyl melamine; hexamethoxymethyl melamine; N,N',N''-triphenyl melamine; and N,N',N''-trimethylol melamine.

Compounds with an imidazoline nucleus constitute still another suitable class of amidine compounds. Suitable compounds of this class include those having the formula

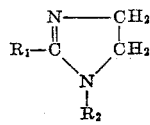

wherein $R_1$ and $R_2$ are inert monofunctional radicals which will not induce undesirable reactions. An especially preferred class of compounds are those wherein $R_1$ is a long chain (at least eleven carbon atoms) aliphatic hydrocarbon group such as an alkyl group, a monoolefinic group or a diolefinic group. $R_2$ may be a short chain (1–10 carbon atoms) aliphatic radical and may contain other functional groups, such as omega hydroxy groups or omega amine groups. 2-aminoethyl and 2-hydroxyethyl groups are particularly useful at the $R_2$ position.

Among the specific imidazoline compounds which are useful are those sold in the trade as "Nalcamines," including "Nalcamine G–11" wherein $R_2$ is a 2-hydroxyethyl group and $R_1$ is a mixture of 11, 13, 15 and 17 carbon aliphatic groups, "Nalcamine G–12" wherein $R_2$ is a 2-hydroxyethyl group and $R_1$ is a mixture of heptadecenyl and heptadecadienyl radicals, "Nalcamine G–13" wherein $R_2$ is a 2-hydroxyethyl group and $R_1$ is a heptodecenyl group, "Nalcamine G–14" wherein $R_2$ is a 2-hydroxyethyl group and $R_1$ is a mixture of pentadecyl and heptadecyl groups, and "Nalcamine G–39M" wherein $R_2$ is a 2-aminoethyl group and $R_1$ is a mixture of heptadecenyl and heptadecadienyl groups. Other suitable imidazoline compounds include compounds of the above formula wherein $R_1$ is hydrogen or a lower alkyl group, such as a methyl, ethyl, isopropyl or butyl group.

We have found that, for satisfactory results, the amidino group must be present in sufficient strength in the molecule containing it. In a preferred embodiment of our invention there must be at least one amidino group for every 22 carbon atoms of the molecule containing the amidino group.

In a particular embodiment of this invention, admixtures of more than one amidine compound may be employed as the stabilizer. These amidine compounds may represent members of the same or different classes as set forth in the foregoing description. Mixtures of amine-substituted triazines and cyanoguanidines are preferred, with a mixture of a cyanoguanidine, and a melamine, being a particularly preferred embodiment. Such amidine mixtures may be provided in all proportions of the components and the components may be added to the oxymethylene polymer singly or in admixture.

In accordance with a preferred embodiment of this invention the aforesaid amidino compounds are added to an oxylmethylene polymer containing carbon-to-carbon single bonds in the main polymer chain. In a particularly preferred embodiment of our invention the amidino compounds are added to an oxymethylene copolymer having at least one chain containing recurring oxymethylene (—OCH$_2$—) units interspersed with —OR— groups in the main polymer chain where R is a divalent radical containing at least two carbon atoms directly linked to each other and positioned in the chain between the two valences with any substitutents on said R radical being inert, that is those which will not induce undesirable reactions. Particularly preferred are copolymers which contain from 60 to 99.6 mol percent of recurring oxymethylene groups. In a preferred embodiment R may be, for example, an alkylene or substituted alkylene group containing at least two carbon atoms.

Among the copolymers which are utilized in accordance with this aspect of the invention are those having a structure comprising recurring units having the formula

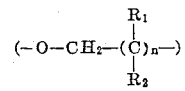

wherein $n$ is an integer from zero to 5 and wherein $n$ is zero in from 60 to 99.6 percent of the recurring units. $R_1$ and $R_2$ are inert substituents, that is, substituents which will not cause undesirable reactions.

A preferred class of copolymers are those having a structure comprising oxymethylene and oxyethylene recurring units wherein from 60 to 99.6 percent of the recurring units are oxymethylene units. These copolymers may be prepared by copolymerizing trioxane with a cyclic ether having the structure

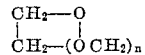

where $n$ is an integer from zero to two.

Examples of preferred polymers include copolymers of trioxane and cyclic ethers containing at least two adjacent carbon atoms such as the copolymers disclosed in U.S. Patent No. 3,027,352.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide.

The preferred polymers which are treated in this invention are thermoplastic materials having a melting point of at least 150° C. and are normally millable at a temperature of 200° C. They have a number average molecular weight of at least 10,000. These polymers have a high thermal stability before treatment in accordance with this invention but this stability is markedly improved by such treatment. For example, if a sample of the treated polymer of this invention is placed in an open vessel in a circulating air oven at a temperature of 230° C. and its weight loss is measured without removal of the sample from the oven, it will have a thermal degradation rate of less than 1.0 wt. percent/min. for the first 45 minutes and, in preferred instances, less than 0.1 wt. percent/min. for the same period of time.

The preferred polymers which are treated in this invention have an inherent viscosity of at least one (measured at 60° C. in an 0.1 weight percent solution in p-chlorophenol containing 2 weight percent of α-pinene). The preferred copolymers of this invention exhibit remarkable alkaline stability. For example, if the preferred copolymers are refluxed at a temperature of about 142°–145° C. in a 50% solution of sodium hydroxide in water for a period of 45 minutes, the weight of the copolymer will be reduced by less than one percent.

The preferred catalysts used in the preparation of the desired copolymers are the boron fluoride coordinate complexes with organic compounds in which oxygen or sulfur is the donor atom.

The coordinate complex of boron fluoride may, for example, be a complex with a phenol, an ether, an ester, or a dialkyl sulfide. Boron fluoride dibutyl etherate, the coordinate complex of boron fluoride with dibutyl ether, is the preferred coordinate complex. The boron fluoride complex with diethyl ether is also very effective. Other boron fluoride complexes which may be used are the complexes with methyl acetate, with ethyl acetate, with phenyl acetate, with dimethyl ether, with methylphenyl ether and with dimethyl sulfide.

The coordinate complex of boron fluoride should be present in the polymerization zone in amounts such that its boron fluoride content is between about 0.001 and about 1.0 weight percent based on the weight of the monomers in the polymerization zone. Preferably, amounts between about 0.003 and about 0.1 weight percent should be used.

The monomers in the reaction zone are preferably anhydrous or substantially anhydrous. Small amounts of moisture, such as may be present in commercial grade reactants or may be introduced by contact with atmospheric air will not prevent polymerization, but should be essentially removed to obtain highest molecular weight polymers.

In one suitable method of preparing the copolymers, the trioxane, cyclic ether and catalyst are dissolved in a common anhydrous solvent, such as cyclohexane, and permitted to react in a sealed reaction zone. The temperature in the reaction zone may vary from about 0° C. to about 100° C. The period of reaction may vary from about 5 minutes to about 72 hours. Pressures from subatmospheric to about 100 atmospheres, or more may be used, although atmospheric pressure is preferred.

It has been found that the relatively minor amounts of the cyclic ether other than trioxane used in the copolymerization reaction generally disappear completely from the reaction mixture. The required ratio of trioxane to cyclic ether in the reaction mixture may therefore be roughly predetermined for a desired mol ratio in the polymer by assuming that all of the cyclic ether is used up and by assuming a particular conversion level from previous experience under substantially comparable conditions.

The chemical constitution of the cyclic ether must also be considered. Thus, 1,3-dioxolane contains both an oxymethylene group and an oxyethylene group. Its incorporation into the copolymer molecule increases both the oxymethylene and the oxethylene content of the polymer molecule.

In general, the cyclic ether is present in the reaction mixture in amounts between about 0.2 and about 30 mol percent, based on the total mols of monomer. The optimum proportion will depend on the particular copolymer desired, the expected degree of conversion and the chemical constitution of the cyclic ether used.

The copolymers produced from the preferred cyclic ethers have a structure substantially composed of oxymethylene and oxyethylene groups in a ratio from about 250:1 to about 1.5:1.

Upon completion of the polymerization reaction it is desirable to neutralize the activity of the polymerization catalyst since prolonged contact with the catalyst degrades the polymer. The polymerization product may be treated with an aliphatic amine, such as tri-n-butylamine, in stoichiometric excess over the amount of free catalyst in the reaction product, and preferably in an organic wash liquid which is a solvent for unreacted trioxane. Or, if desired, the reaction product may be washed with water which neutralizes catalyst activity. A detailed description of the methods of neutralizing catalyst activity may be found in U.S. Patent No. 2,989,509 of Donald E. Hudgin and Frank M. Berardinelli.

In a preferred embodiment of this invention the polymer composition also contains a phenolic material, preferably an alkylene bisphenol, as a thermal stabilizer. It appears that the stabilization action of the amidine compounds and of the phenols enhance each other so that a mixture of a stabilizer of each class is more effective than a comparable amount of stabilizer of either class, by itself.

A suitable class of alkylene bisphenols includes compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene bis-(4-methyl-6-tertiary butyl phenol), 2,2'-ethylene bis-(4-methyl-6-tertiary butyl phenol), 4,4'-ethylidene bis-(6-tertiary butyl-3-methyl phenol) and 4,4'-butylidene bis-(6-tertiary butyl-3-methyl phenol). Suitable phenolic stabilizers other than alkylene bisphenols include 2,6-ditertiary butyl-4-methyl phenol, octyl phenyl and p-phenyl phenol.

Particularly effective are the mixtures in all proportions of at least two amidine compounds and a phenolic stabilizer, such as the mixture of a cyanoguanidine, an amine substituted triazine, and an alkylene bisphenol. The most preferred such stabilizer combinations employ a melamine compound as the amine substituted triazine.

While the amidine-phenolic compound stabilizer system imparts the desired thermal stability, with certain systems the stabilized polymer may exhibit slight undesirable exudation upon maintenance for extended periods of time at elevated temperatures. Similarly certain other such systems may result in the stabilized polymer exhibiting undesirable color characteristics.

Melamine compound-cyanoguanidine compound admixtures have been found to optimize thermal and structural stability and color properties of the stabilized polymer, and in some instances represent an improved stabilizer system over the use of either amidine compound, alone. Most preferably, the stabilizer system comprises a melamine compound, a cyanoguanidine compound, and a phenolic material such as the alkylene bisphenols.

The amidine compounds are generally admixed with the oxymethylene polymer in amounts not exceeding 5%, based on the weight of the oxymethylene polymer, preferably in amounts between about 1 and 0.01 weight percent and most preferably between about 0.03 and 0.2 weight percent. The alkylene bisphenol, when used, is admixed in amounts not exceeding 5 weight percent and preferably from about 1 to about 0.1 weight percent, most preferably 1–0.3 wt. percent.

While mixtures of amidines, and mixtures therewith of phenolic stabilizers, may be employed in all proportions, in a preferred embodiment the stabilizer system comprises from about 0.01 to 0.2 weight percent of an amine substituted triazine, and from .05 to 1.0 weight percent of a cyanoguanidine, most preferably in combination with from about 0.3 to 1.0 weight percent of an alkylene bisphenol.

The amidine compounds, and the alkylene bisphenols, if desired, may be admixed intimately with the oxymethylene polymer by being applied in solution in a suitable solvent to the finely divided solid oxymethylene polymer followed by evaporation of the solvent.

The admixture may also be made by dry blending the finely divided oxymethylene polymer and finely divided stabilizers and by milling the stabilizers into the polymer as the latter is worked on a rubber mill.

The compositions of this invention may also include, if desired, plasticizers, fillers, pigments and other stabilizers such as those which are stabilizers against degradation by ultraviolet light. The oxymethylene polymer may be stabilized against degradation by ultraviolet light by the addition, for example, of about 1% by weight of 2,2-dihydroxy-4,4' dimethoxy-benzophenone, 2-hydroxy-4-methoxy benzophenone; 2-hydroxy-4-methoxy-4'-chlorobenzophenone, etc.

*Example I*

Trioxane was polymerized batch-wise in a sigma blade kneading mixer in admixture with ¼ its weight of cyclohexane and 0.0175 times its weight of dioxolane. 65 p.p.m. of boron fluoride dibutyletherate, as catalyst was present in the mixture. The reaction mixture was maintained at a temperature between 54° to 55° C. for an additional 100 minutes. The polymer formed had an inherent viscosity of 1.6 (measured at 60° C. in 0.1 weight percent solution in p-chlorophenol containing 2 weight percent of α-pinene).

Fifty parts by weight of the above described copolymer, 0.25 part of cyanoguanidine and 0.25 part of 2,2'-methylene bis-(4-methyl-6-tertiary butyl phenol) were milled at 200–202° C. for 45 minutes in a heated chamber provided with a sigma-blade-type mixer.

The thermal degradation rate of the thus treated polymer (when maintained in an open vessel in a circulating air oven at 222° C. and measured without removal of the sample from the oven) was 0.00 wt. percent/min. for the first 18 minutes and 0.04 wt. percent/min. for the remainder. The copolymer, prior to treatment, had a degradation rate of 4 wt. percent/min.

*Example II*

Example I was repeated except that the amount of cyanoguanidine was reduced to 0.05 part. The thermal degradation rate (measured as above) was 0.00 wt. percent/min. for the first 18 minutes and 0.04 wt. percent/min. for the remainder.

*Example III*

Example I was repeated except that both stabilizers were reduced in amount to 0.10 part. The thermal degradation rate was 0.01 wt. percent/min. for the entire sample.

*Example IV*

Cyanoguanidine (0.1 wt. percent) and 2,2'-methylene bis (4-methyl-6-tertiary butyl phenol) (0.5 wt. percent) were incorporated into an oxymethylene homopolymer in a heated chamber having counter-rotating twin shallow screws for for kneading. The degradation rate of the polymer (measured as above) was 0.9 wt. percent/min.

*Example V*

Trioxane was polymerized at 60° C. for 75 minutes in a sigma blade kneading mixer in admixture with ⅗ its weight of cyclohexane, 2.5% its weight of dioxolane and 0.021% its weight of boron fluoride dibutyl etherate. The reaction product was washed with acetone containing a small amount of tributylamine. The dried polymer amounted to 57.8% yield based on total monomers. The polymer contained 4.2 wt. percent of monomeric units derived from dioxolane.

A polyaminotriazole of isosebacic acid, having and I.V. of about 0.4 in m-cresol (0.1 wt. percent solution at 25° C.) was prepared by the reaction of 100 g. of isosebacic acid and 70 cc. of hydrazine hydrate in an autoclave. The autoclave was heated to 220° C. for 18 hrs. and 260° for 3 hrs. Pressure reached 1000 p.s.i. during reaction.

Three parts by weight of the above described trioxanedioxolane copolymer was slurried with a solution of 0.06 part of the above described polyaminotriazole in about 12 parts of methanol. The methanol was allowed to evaporate at room temperature with occasional stirring and then the polymer was dried at 65° C. for two hours. A disc was compression molded from this material for 4 minutes at 190° C. and 1500 p.s.i.g. The disc had a thermal degradation rate (when maintained in an open vessel in a circulating air oven at 222° C.) of 0.63 wt. percent/min. for the first 18% of the polymer and 0.47 wt. percent/min. for the remainder. The thermal degradation rate for the copolymer before treatment with the polyaminotriazole was 1.3 wt. percent/min.

*Example VI*

The polyaminotriazole of Example V and a similar polyaminotriazole prepared from sebacic acid were each incorporated into a sample of a copolymer of trioxane and dioxolane (having 4.5 wt. percent of monomeric units derived from dioxolane) together with 2,2'-methylene bis (4-methyl-6-tertiary butyl phenol). 0.5 wt. percent of each stabilizer was used and incorporated into the polymer by milling in air for 45 minutes at 200° C. The sample containing the polyaminotriazole from sebacic acid had a thermal degradation rate of 0.08 wt. percent/min. while the sample containing the polyaminotriazole from isosebacic acid had a thermal degradation rate of 0.04 wt. percent/min. (both measured as described above.)

*Example VII*

Forty parts by weight of a trioxane-dioxolane copolymer having 5 wt. percent of monomeric units derived from dioxolane and having an inherent viscosity of 1.8, 0.4 part of benzoguanamine and 0.4 part of 2,2'-methylene bis (4-methyl-6-tertiary butyl phenol) were milled on a heated chamber provided with a sigma blade-type mixer for 45 minutes at 200–202° C. The thus treated polymer had a degradation rate (in terms of weight loss per minute when maintained in an open vessel in a circulating air oven at 222° C.) of 0.05 percent/min. The degradation rate before treatment was 3.2 weight percent/min.

*Example VIII*

Example VII was repeated except that the phenolic stabilizer was 4,4' butylidene bis (6-tertiary butyl-3-methyl phenol). The degradation rate for the treated polymer was 0.04 wt. percent/min.

*Example IX*

Forty parts by weight of a trioxane-dioxolane copolymer having 5.1 wt. percent of monomeric units derived from dioxolane and having an inherent viscosity of 1.4, 0.4 parts of N,N-diallylmelamine and 0.4 part of 2,2'-methylene bis(4-methyl-6-tertiary butyl phenol) were mixed by tumbling and then milled for 30 minutes at 200–202° C. under nitrogen in a heated chamber having a pair of counter-rotating screws. The screws were substantially cylindrical in shape, each having a shallow halical concavity of long pitch. The chamber was heated by the circulation of hot oil through jacketed walls. At the completion of this treatment the thermal degradation of the polymer (measured as above) was 0.00 percent/min. for the first 18 minutes and 0.02 percent/min. for the remainder. The polymer, prior to stabilization had a degradation rate of 3.0 percent/min.

*Example X*

Example IX was repeated except that the amounts of stabilizers were cut to 0.04 part of N,N-diallylmelamine and 0.08 part of the phenolic stabilizer. The degradation rate after treatment was 0.000 percent/min. for the first 18 minutes and 0.05 percent/min. for the remainder.

*Example XI*

Four hundred parts by weight of the polymer of Example IX, 4 parts of N,N-diallylmelamine and 4 parts of 2,2′-methylene bis (4-methyl-6-tertiary butyl phenol) were dry blended to a uniform admixture and then extruded at a barrel temperature of 360° F. and a screw speed of 40–45 r.p.m. The extrudate, having a diameter of about ⅛ inch was chipped into pieces about ¼ inch long. The pieces were placed in an open vessel in an oven at 160° C. under a constant stream of nitrogen. Samples of polymer were removed at hourly intervals and tested for degradation rate as described above. The results were as follows:

Time, hrs.: Degradation rate
1 _____ 0.04
2 _____ 0.06
3 _____ 0.05
4 _____ 0.03
5 _____ 0.04

*Example XII*

Example IX was repeated except that melamine was substituted for the N,N-diallylmelamine and the polymer was a copolymer of trioxane and dioxolane, having 5.5 wt. percent of units derived from the latter. The degradation rate of the treated polymer was found to be 0.02%/min. The polymer, prior to treatment had a degradation rate of 2.2%/min.

*Example XIII*

Stearoguanamine (1.9 wt. percent) and 2,2′methylene bis(4-methyl-6-tertiary butyl phenol) (1 wt. percent) were incorporated into the copolymer of Example VII in the manner described therein. The thermal degradation rate of the thus treated polymer was 0.05 wt. percent/min.

*Example XIV*

Example IX was repeated except that for the copolymer, there was substituted a trioxane homopolymer having a raw thermal degradation rate in excess of 10 wt. percent/min. The degradation rate after treatment was 0.57 wt. percent/min.

*Example XV*

Example IX was repeated except that the phenolic stabilizer was omitted. The degradation rate of the treated polymer was 0.22 wt. percent/min.

*Example XVI*

Fifty parts of the copolymer of Example I was milled at 200–202° C. for 45 minutes with 0.25 part of 2,2′-methylene bis(4-methyl-6-tertiary butyl phenol) and 0.05 part of "Nalcomine G–13" on a heated chamber provided with a sigma blade-type mixer. The thermal degradation rate (measured as above) was 0.025 wt. percent/min. Prior to treatment the polymer had a degradation rate of 4.0.

*Example XVII*

Example XVI was repeated except that "Nalcomine G–14" was substituted for the "Nalcomine G–13" on an equal weight basis. The degradation rate was reduced to 0.06 wt. percent/min.

*Examples XVIII–XXIV*

In Table I there is shown the results of the use of a number of additives with a copolymer of trioxane and 2.0% ethylene oxide which had a thermal degradation rate (at 230° C.) of about 1.0% wt. percent/min.

TABLE I

| | Additive | Thermal degradation rate at 230° C. for 45 min. wt. percent/min. |
|---|---|---|
| XVIII | 0.10% N,N-di-(2-hydroxyethyl)melamine, 0.50% 2,2′-methylene bis-(4-methyl-6-tertiary butyl phenol). | 0.023 |
| XIX | 0.10% N,N′,N″-trimethylmelamine, 0.50% 2,2′-methylene bis-(4-methyl-6-tertiary butyl phenol). | 0.016 |
| XX | 0.10% N,N′,N″-triethylmelamine, 0.50% 2,2′-methylene bis-(4-methyl-6-tertiary butyl phenol). | 0.024 |
| XXI | 0.10% N,N′,N″-tri-n-propylmelamine, 0.50% 2,2′-methylene bis-(4-methyl-6-tertiary butyl phenol). | 0.011 |
| XXII | 0.10% N,N′,N″-tri-n-butylmelamine, 0.50% 2,2′-methylene bis-(4-methyl-6-tertiary butyl phenol). | 0.062 |
| XXIII | 0.10% N,N,N′,N″-tetramethylmelamine, 0.50% 2,2′-methylene bis-(4-methyl-6-tertiary butyl phenol). | 0.029 |
| XXIV | 0.10% N,N-diethylmelamine, 0.50% 2,2′-methylene bis-(4-methyl-6- tertiary butyl phenol). | 0.012 |

The above melamine compounds provide improved results when added without the phenolic stabilizer used in Table I, but, as pointed out previously, the two materials enhance the effect of each other producing the very excellent results indicated above. Other melamine compounds such as trimethylolmelamine and trimethoxymelamine also gave improved results.

The milling operations in all the above examples were carried out at a temperature of about 200° C. Formaldehyde gas was given off by the polymers during the milling operations.

*Example XXV*

0.10 wt. percent of cyanoguanidine and 0.50 wt. percent of 2,2′-methylene bis-(4-methyl-6-tertiary butyl phenol) were blended with a trioxane-ethylene oxide copolymer (containing about 2 wt. percent of oxyethylene units) by tumbling the dry ingredients for 1 hour. The stabilized copolymer was extruded (at a dye temperature of 400–420° F., utilizing about a three minute residence time) and the extruded copolymer was pelletized.

The thermal degradation rate of the pelletized stabilized copolymer, determined at 230° C. in a circulating air oven, was 0.015% per minute. The stabilized copolymer sample exhibited an overall 5½ hour weight loss at 230° C. of 6.7%.

13 grams of the pelletized, stabilized copolymer was charged to the bore of an Extrusion Plastometer (described in ASTM D–1238–57T) confined in the barrel for 30 minutes at 230° C., discharged, and compression molded (at 190° C. for 1 minute without application of pressure, and 4 minutes at 6500 p.s.i.g.), into an 11 gram disc having a 2½″ diameter. These compression molded discs were color measured with the Hunterlab D–25 Color Meter.

The Hunterlab Color Meter test yields a read-out on three scales, L, a and b. The L scale is a measure of lightness and varies from 100 for perfect white to zero for black. a measures redness when plus, gray when zero, greenness when minus, and b measures yellowness when plus, gray when zero, blueness when minus. Thus, visually tan to brown discoloration observed after the foregoing test is characterized by increased positive a values, increased high positive b values, and decreased L values.

The copolymer of this example exhibited natural and stabilized color characteristics as follows:

| L | 91.8 | 86.2 |
|---|---|---|
| a | −0.5 | −2.3 |
| b | 4.0 | 18.5 |

A sample of the originally extruded stabilized copolymer was injection molded (at 420°–430° F., a pressure of 25,000 pounds, a dye temperature of 120° C., and a 60 second cycle) into 1″ by 3″ bars. The bars were suspended in air and maintained at temperatures of 100° C. and 121° C. No exudation, measured by wiping the surface with a dark cloth, was exhibited by the injection molded bars for periods up to 18 days.

*Examples XXVI–XXIX*

The following table reports the results of Examples XXVI–XXIX, which were carried out according to the procedure set forth in Example XXV. In every case, no exudation was exhibited by the injection molded bars when maintained at temperatures of 100° C. and 121° C., up to 18 days.

teristics of the stabilized and unstabilized copolymer, as measured by the Hunterlab Color Meter were as follows:

|  | Unstabilized | Stabilized |
|---|---|---|
| L | 86.5 | 83.3 |
| a | −1.2 | −2.4 |
| b | 6.8 | 13.7 |

Examples XXV–XXXV thus illustrate the combination of improved thermal and structural stability and improved color characteristics with the use of a mixture of amidine compounds in the stabilizer system, as compared to the use of a single such amidine compound (although it will be noted that the use of such a single amidine compound provides a more thermally stabilized composition than the polymer alone, and that thermal degradation rates taken alone are approximately equivalent in the two systems). This improved stabilizer combination is particularly effective when employed in conjunction with a phenolic stabilizer such as the alkylene bisphenols.

It is to be understood that the foregoing detailed de-

TABLE II

| Example | Stabilizers | KD230, Percent/min. | 5½ Hour Weight Loss at 230° C., Percnet | Unstabilized Copolymer Color L, a, b | Stabilized Copolymer Color L, a, b | Color on Heat Aging 7 Days 121° C. in Air L, a, b |
|---|---|---|---|---|---|---|
| XXVI | 0.10% Cyanoguanidine, 0.50% 4,4′-butylidene bis-(6-tertiary butyl-3-methyl phenol). | 0.019 | 9.2 | 91.5 −1.0 2.8 | 88.3 −5.8 17.9 | 84.2 −4.6 25.9 |
| XXVII | 0.10% Cyanoguanidine, 0.03% Melamine, 0.50% 2,2′-methylene bis-(4-methyl-6-tertiary butyl phenol). | 0.012 | 5.0 | 90.2 −1.2 4.0 | 86.5 −2.7 16.2 | 84.9 −2.0 15.3 |
| XXVIII | 0.10% Cyanoguanidine, 0.06% Melamine, 0.50% 2,2′-methylene bis-(4-methyl-6-tertiary butyl phenol). | 0.014 | 6.3 | 90.8 −0.7 3.3 | 87.6 −2.3 13.3 | 82.9 −0.8 17.5 |
| XXIX | 0.05% Cyanoguanidine, 0.06% Melamine, 0.50% 2,2′-methylene bis-(4-methyl-6-tertiary butyl phenol). | 0.015 | 7.3 | 90.3 −0.4 3.4 | 88.5 −2.4 10.5 | 84.3 −0.2 14.0 |

*Examples XXX–XXXIV*

The procedure of Example XXV was repeated, employing stabilization systems of 0.10% benzoguanamine, 0.10% cyanoguanidine, and 0.50% 2,2′-methylene bis-(4-methyl-6-tertiary butyl phenol); 0.20% benzoguanamine, 0.03% melamine and 0.50% 2,2′-methylene bis-(4-methyl-6-tertiary butyl phenol); 0.15% diethylmelamine, 0.03% melamine, and 0.50% 2,2′-methylene bis-(4-methyl-6-tertiary butyl phenol); and 0.10% cyanoguanidine, 0.03% melamine, and 0.50% 4,4′ butylidene bis(6-tertiary butyl-3-methyl phenol). In each instance thermal and structural stability and color characteristics were excellent. The system employing 4,4′ butylidene bis(6-tertiary butyl-3-methyl phenol) showed exceptional color stability upon aging in hot water (80° C.) for periods of at least 8 days. For certain applications, substitution of a linear polyamide for one or more of the amidine stabilizers is desirable. Particularly effective is a terpolyamide of polycaprolactam, polyhexamethylene adipamide, polyhexamethylene sebacamide, and especially the 38%/35%/27% terpolymer.

*Example XXXV*

0.1 weight percent of cyanoguanidine, 0.15 weight percent melamine, and 0.5 weight percent of 2,2′-methylene bis-(4-methyl-6-tertiary butyl phenol), together with a trioxane ethylene oxide copolymer (containing about 2 weight percent of oxyethylene units) were charged to a jacketed stainless steel chamber and milled within the chamber by two counter-rotating sigma blades for 5–7 minutes at 200° C. under nitrogen. The color characscription is given merely by way of illustration and that many variations may be made therein without departing from the spirit of our invention.

The embodiments of the invention in which an exclusive property or privilege is claimed are defined as follows:

1. A polymer composition having enhanced thermal stability comprising
   (1) an oxymethylene polymer having a melting point of at least 150° and
   (2) a thermal stabilizer therefor comprising a stabilizing amount of at least one amidine compound selected from the group consisting of
      (a) compounds selected from the group consisting of cyanoguanidine and cyanoguanidine compounds substituted with inert substituents;
      (b) polyaminotriazoles containing structural units of the formula $$-R-C\underset{N\underline{\quad\quad}N}{\overset{\overset{\displaystyle NH_2}{\underset{|}{N}}}{\diagup\diagdown}}C-$$

wherein R is a divalent organic radical containing only inert groups therein;
   (c) amine substituted derivatives of symmetrical triazines containing only inert substituents (d) compounds having an imidazoline nucleus and having the formula

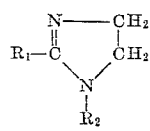

wherein $R_1$ is a long chain aliphatic radical containing at least eleven carbon atoms and $R_2$ is a short chain aliphatic radical containing one to ten carbon atoms.

2. The polymer composition of claim 1 including an alkylene bisphenol thermal stabilizer.

3. The polymer composition of claim 1 wherein said polymer is an oxymethylene copolymer having at least one chain containing at least 60 mol percent recurring oxymethylene ($-OCH_2$) units interspersed with $-OR-$ groups in the main polymer chain where R is a divalent radical containing at least two carbon atoms directly linked to each other and positioned in the chain between the two valences with any substituents on the R radical being inert.

4. The polymer composition of claim 3 including an alkylene bisphenol thermal stabilizer.

5. The polymer composition of claim 1 wherein said amidine compound is cyanoguanidine.

6. The polymer composition of claim 1 wherein said amidine compound is melamine.

7. A polymer composition comprising (1) an oxymethylene polymer having a melting point of at least 150° C., (2) from about .01 to about 0.2 weight percent, based upon the polymer, of an amine substituted triazine compound, (3) from about .05 to about 1.0 weight percent, based upon the polymer of a cyanoguanidine compound, and (4) from about 0.3 to about 1.0 weight percent, based upon the polymer of an alkylene bisphenol.

8. The composition of claim 7, said alkylene bisphenol having from 1 to 4 carbon atoms in the alkylene group, from zero to 2 alkyl substituents on each benzene ring, each alkyl substituent having from 1 to 4 carbon atoms.

9. The composition of claim 8, wherein said amine substituted triazine compound is melamine, and said cyanoguanidine compound is cyanoguanidine.

10. The composition of claim 8, wherein said amine substituted triazine compound is a benzoguanamine.

11. A polymer composition comprising (1) an oxymethylene copolymer having at least one chain containing at least 60 mol percent recurring oxymethylene ($-OCH_2-$)

units interspersed with $-OR-$ units in the main polymer chain, where R is a divalent radical containing at least two carbon atoms directly linked to each other and positioned in the chain between the two valences with any substituents on the R radical being inert, (2) from about .01 to about 0.2 weight percent based upon the polymer, of melamine, (3) from about .05 to about 1.0 weight percent based upon the polymer of cyanoguanidine, and (4) from about 0.3 to about 1.0 weight percent based upon the polymer, of an alkylene bisphenol having from 1 to 4 carbon atoms in the alkylene group and having from zero to 2 alkyl substituents on each benzene ring, each alkyl substituent having from 1 to 4 carbon atoms.

12. The composition of claim 11, wherein said alkylene bisphenol is 2,2'-methylene bis-(4-methyl-6-tertiary butyl phenol).

13. The polymer composition of claim 1 wherein the thermal stabilizer is a mixture of cyanoguanidine and melamine.

14. The polymer composition of claim 3 wherein the thermal stabilizer is a mixture of cyanoguanidine and melamine.

15. The polymer composition of claim 1 wherein said polymer is an oxymethylene copolymer having at least one chain containing at least 60 mol percent recurring oxymethylene ($-OCH_2$) units interspersed with oxyethylene units in the main polymer chain.

16. The polymer composition of claim 15 wherein the thermal stabilizer comprises cyanoguanidine.

17. The polymer composition of claim 16 wherein the concentration of oxyethylene units in the main polymer chain is about 2 weight percent and the concentration of cyanoguanidine is about 0.05 to about 1.0 weight percent, based upon the weight of the polymer.

References Cited by the Examiner
UNITED STATES PATENTS

| | | | |
|---|---|---|---|
| 2,848,437 | 8/1958 | Langsdorf et al. | 260—45.9 X |
| 2,993,025 | 7/1961 | Alsup et al. | 260—45.95 X |
| 3,103,499 | 9/1963 | Dolce et al. | 260—45.7 |

LEON J. BERCOVITZ, *Primary Examiner.*

W. J. WELSH, *Assistant Examiner.*